US010669923B2

(12) United States Patent
Kloft et al.

(10) Patent No.: US 10,669,923 B2
(45) Date of Patent: Jun. 2, 2020

(54) COMBUSTION MACHINE

(71) Applicant: VOLKSWAGEN AKTIENGESELLSCHAFT, Wolfsburg (DE)

(72) Inventors: Manfred Kloft, Königslutter (DE); Stefan Tölle, Königslutter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 28 days.

(21) Appl. No.: 15/521,226

(22) PCT Filed: Aug. 26, 2015

(86) PCT No.: PCT/EP2015/069493
§ 371 (c)(1),
(2) Date: Apr. 21, 2017

(87) PCT Pub. No.: WO2016/045895
PCT Pub. Date: Mar. 31, 2016

(65) Prior Publication Data
US 2017/0298805 A1 Oct. 19, 2017

(30) Foreign Application Priority Data

Sep. 24, 2014 (DE) .................. 10 2014 219 252

(51) Int. Cl.
*F01P 5/10* (2006.01)
*F01P 7/16* (2006.01)
(Continued)

(52) U.S. Cl.
CPC .............. *F01P 7/165* (2013.01); *F01P 3/02* (2013.01); *F01P 3/20* (2013.01); *F01P 7/167* (2013.01);
(Continued)

(58) Field of Classification Search
CPC ...... F01P 7/165; F01P 3/02; F01P 3/20; F01P 7/167; F01P 2003/027; F01P 2060/08; F16K 11/085
(Continued)

(56) References Cited

U.S. PATENT DOCUMENTS 6,539,899 B1 * 4/2003 Piccirilli ................. F01P 7/167
123/41.08
6,659,050 B1 * 12/2003 Creech .................... F01P 7/167
123/41.08
(Continued)

FOREIGN PATENT DOCUMENTS

CN 102414415 A 4/2012
CN 103917759 A 7/2014
(Continued)

OTHER PUBLICATIONS

Search report for German Patent Application No. 10 2014 219 252.8, dated Jun. 3, 2015.
(Continued)

*Primary Examiner* — Hung Q Nguyen
*Assistant Examiner* — Anthony Donald Taylor, Jr.
(74) *Attorney, Agent, or Firm* — Pearl Cohen Zedek Latzer Baratz LLP

(57) ABSTRACT

A combustion machine comprising an internal combustion engine and a cooling system that has a coolant pump, a main cooler, a heating heat exchanger, a bypass which bypasses the heating heat exchanger, coolant ducts in the internal combustion engine, and a regulating device with an actuator which serves for the regulated distribution of a coolant as a function of at least one local coolant temperature. The invention is characterized in that, when the actuator is actuated in one direction, the regulating device—when it is in a first position, allows coolant flow through the internal
(Continued)

combustion engine and the heating heat exchanger, and prevents coolant from flowing through the bypass and the main cooler;—when it is in a second position, additionally allows coolant to flow through the bypass; and—when it is in a third position, additionally allows coolant to flow through the main cooler.

13 Claims, 4 Drawing Sheets

(51) Int. Cl.
  *F01P 3/20* (2006.01)
  *F16K 11/085* (2006.01)
  *F01P 3/02* (2006.01)
  *F01P 7/14* (2006.01)

(52) U.S. Cl.
  CPC ....... *F16K 11/085* (2013.01); *F01P 2003/027* (2013.01); *F01P 2007/146* (2013.01); *F01P 2060/08* (2013.01)

(58) Field of Classification Search
  USPC ........................................ 123/41.44
  See application file for complete search history.

(56) References Cited

U.S. PATENT DOCUMENTS

| | | | |
|---|---|---|---|
| 7,735,514 B2* | 6/2010 | Marstorp | F16K 1/526 137/501 |
| 2003/0079728 A1* | 5/2003 | Marsh | F01P 3/20 123/563 |
| 2004/0173167 A1* | 9/2004 | Chanfreau | B60H 1/00485 123/41.1 |
| 2005/0034688 A1* | 2/2005 | Lelkes | F01P 7/167 123/41.01 |
| 2006/0070672 A1* | 4/2006 | Martins | B60H 1/00485 137/625.47 |
| 2010/0212612 A1* | 8/2010 | Vacca | F01P 7/165 123/41.09 |
| 2011/0247575 A1* | 10/2011 | Heldberg | F01P 7/14 123/41.08 |
| 2012/0048217 A1* | 3/2012 | Triebe | F01P 7/14 123/41.1 |
| 2012/0160192 A1* | 6/2012 | Magnier-Cathenod | F01P 7/14 123/41.08 |
| 2013/0160723 A1* | 6/2013 | Miyagawa | F01P 7/16 123/41.1 |
| 2013/0277595 A1* | 10/2013 | Norlander | F16K 3/26 251/333 |
| 2014/0326199 A1 | 11/2014 | Hayashi et al. | |

FOREIGN PATENT DOCUMENTS

| | | | |
|---|---|---|---|
| DE | 44 32 292 A1 | 3/1996 | |
| DE | 10 047 080 A1 | 4/2002 | |
| DE | 10 047 081 A1 | 5/2002 | |
| DE | 103 42 935 A1 | 4/2005 | |
| DE | 602 09 019 T2 | 8/2006 | |
| DE | 10 2008 007 766 A1 | 8/2009 | |
| DE | 10 2009 010 947 B3 | 6/2010 | |
| DE | 102009010947 | * 6/2010 | ............ F16K 11/163 |
| DE | 10 2010 044 167 A1 | 5/2012 | |
| DE | 10 2011 119 237 A1 | 5/2013 | |
| DE | 20 2014 100 189 U1 | 3/2014 | |
| DE | 10 2013 214 838 A1 | 5/2014 | |
| FR | 2 849 673 A1 | 7/2004 | |
| FR | 2 850 726 A1 | 8/2004 | |
| JP | 4741794 B2 | 8/2011 | |
| JP | 2013-130166 A | 7/2013 | |
| WO | WO 03/006857 A1 | 1/2003 | |
| WO | WO 2013/069325 A1 | 5/2013 | |

OTHER PUBLICATIONS

International Search Report of PCT Application No. PCT/EP2014/069493, dated Nov. 12, 2015.

Search Report for Chinese Patent Application No. 201580051968.X, dated Sep. 10, 2018.

Office Action for Korean Patent Application No. 10-2017-7008103, dated Oct. 29, 2018.

* cited by examiner

COMBUSTION MACHINE

CROSS-REFERENCE TO RELATED APPLICATIONS

This application is a National Phase Application of PCT International Application No. PCT/EP2015/069493, International Filing Date Aug. 26, 2015, claiming priority of German Patent Application No. 10 2014 219 252.8, filed Sep. 24, 2014, which is hereby incorporated by reference in its entirety.

FIELD OF THE INVENTION

The invention relates to a combustion machine.

BACKGROUND OF THE INVENTION

As a rule, combustion machines for motor vehicles have a cooling system in which a coolant is pumped through at least one cooling circuit by means of one or more pumps and, in the process, it picks up thermal energy from components that are integrated into the cooling circuit, especially from an internal combustion engine as well as from an oil cooler and/or an intercooler. In an ambient heat exchanger, the so-called main water cooler, as well as at times, in a heating heat exchanger, this thermal energy is subsequently released into the ambient air; in the case of the heating heat exchanger, this energy is released into the ambient air provided for the climate control of the interior of the motor vehicle.

Cooling systems of modern motor vehicles often have several cooling circuits. For instance, it is a known approach to provide a so-called large or main cooling circuit as well as a small cooling circuit, sections of which have an integrated configuration, whereby a thermostat-controlled valve is used to convey the coolant either via the main cooling circuit or via the small cooling circuit. This is done as a function of the temperature of the coolant, so that, for example, during the warm-up phase of the combustion machine, when the coolant has not yet reached a prescribed operating temperature, the coolant is conveyed in the small cooling circuit, thereby bypassing the main cooling circuit, that is to say, the ambient heat exchanger in which the coolant is cooled mainly by heat transfer to the ambient air. In contrast, once the coolant has reached the operating temperature range, the coolant is conveyed in the large cooling circuit by means of the thermostat-controlled valve, so that overheating of the cooling system is prevented, thanks to the transfer of heat from the coolant to the ambient air. The heating heat exchanger, as the second ambient heat exchanger, in contrast, is normally integrated into the small cooling circuit, as a result of which the interior of the motor vehicle can already be heated during the warm-up phase of the combustion machine.

The (main) coolant pump of the cooling system is normally driven mechanically by the internal combustion engine of the combustion machine. Its pumping capacity is thus fundamentally proportional to the rotational speed of the crankshaft of the internal combustion engine. Even though the demand for cooling capacity also tends to increase as the rotational speed of the internal combustion engine rises, in many operating states, the cooling capacity that can theoretically be achieved by the operation of the pump does not correspond to the actual demand for cooling capacity. Since a sufficiently high cooling capacity should be available in all operating states, such mechanically driven pumps are often over-dimensioned. Consequently, the efforts aimed at reducing the fuel consumption of motor vehicles have led to the development of mechanically driven coolant pumps that can be regulated within certain limits in terms of their volume flow. Such a regulatable mechanically driven coolant pump is disclosed, for example, in German patent application DE 10 2010 044 167 A1.

When it comes to the cooling systems of modern motor vehicles, the main regulation of the volume flow of coolant can thus be achieved by means of regulatable coolant pumps, whereas the distribution of the volume flow to the individual components that each have a different demand for cooling can be achieved by valves that are actively controlled, especially by means of thermostats. German patent application DE 103 42 935 A1, for instance, discloses a combustion machine with a cooling circuit encompassing a pump that is mechanically driven by an internal combustion engine. The pump capacity is thus dependent on the rotational speed of the internal combustion engine. In order to attain individually adapted volume flows of the coolant for several heat exchangers integrated into the cooling circuit, especially such as cooling ducts of a cylinder block and of a cylinder head of the internal combustion engine, as well as for a heating heat exchanger that serves for the interior heating of a motor vehicle driven by a combustion machine, a plurality of control valves that can be actuated individually are integrated into the cooling circuit. German patent application DE 103 42 935 A1 also discloses that the ducts of the cylinder block and of the cylinder head are connected in parallel, which makes it possible to individually regulate the cooling capacity for these components. The cooling system known from German patent application DE 103 42 935 A1 is relatively complex.

German patent application DE 100 47 080 A1 discloses an internal combustion engine with a cylinder block and a cylinder head, each having coolant ducts that are part of a cooling circuit. Coolant is first conveyed by a coolant pump into a distributor strip which is integrated into the cylinder block and which is configured in the form of ducts that are open towards the separation plane towards the cylinder head. Starting from the distributor strip, the coolant flows into the coolant ducts of the cylinder block and into the coolant ducts of the cylinder head through openings in a cylinder head gasket installed between the cylinder block and the cylinder head. As a result, internal combustion engines that use identical cylinder blocks and cylinder heads can be adapted in terms of a distribution of the coolant between the cylinder block and the cylinder head in that cylinder head gaskets having differently dimensioned openings for the coolant are used.

German patent application DE 10 047 081 A1 discloses a combustion machine with a cooling system in which the flow of coolant through coolant ducts that are configured in a cylinder block on the one hand and in a cylinder head on the other hand can be regulated by means of a distributing unit using thermostat-controlled valves installed in the coolant ducts. In this context, it is provided that, during a warm-up phase of the combustion machine, the amount of coolant conveyed through the cylinder block is only what is necessary to expel vapor bubbles and to heat the thermostat-controlled valve situated there, and that the amount of coolant conveyed through the cylinder head is only what is needed to expel vapor bubbles, to heat the thermostat-controlled valve situated there and, if applicable, to provide the required heating capacity of a downstream heating heat exchanger.

Before the backdrop of this state of the art, the invention is based on the objective of making it possible to simply and inexpensively adapt the flow of coolant through the individual components of a combustion machine having a cooling system comprising several components.

SUMMARY OF THE INVENTION

This objective is achieved by a combustion machine according to the claims. Advantageous embodiments of the combustion machine according to the invention are the subject matter of the other patent claims and ensue from the description of the invention below.

The invention is based on the notion that, by using an intelligent sequence of switching the individual components of the cooling system on and off, these components, which have to be regulated in terms of the coolant flowing through them, can be regulated by means of just one actuator that then has to be actuated.

Towards this end, in the case of a combustion machine that has at least one internal combustion engine and a cooling system, the latter having at least one coolant pump, a main cooler, a heating heat exchanger, a bypass that bypasses the heating heat exchanger, coolant ducts in the internal combustion engine as well as a regulator with a (preferably electric, optionally hydraulic and/or pneumatic) actuator which serves for a regulated distribution of the coolant as a function of at least one local coolant temperature, it is provided according to the invention that, when the actuator is actuated in one (actuating or movement) direction, the regulator,

- when it is in a first position, allows coolant to flow through the internal combustion engine and through the heating heat exchanger, and prevents coolant from flowing through the bypass and through the ambient heat exchanger;
- when it is in a second position, additionally allows coolant to flow through the bypass; and
- when it is in a third position, additionally allows coolant to flow through the main cooler.

This configuration of the combustion machine allows an advantageous regulation and distribution of the coolant in the cooling system by means of just one actuator.

In particular, it can be provided in this context that, when the regulator is in the first position, only a relatively small volume flow of coolant is pumped by the coolant pump through a small cooling circuit (which bypasses the main cooler) of the cooling system, whereby coolant only flows through the internal combustion engine (at least partially) and the heating heat exchanger. Since only a relatively small volume flow of coolant is pumped through the internal combustion engine, especially after a cold start of the combustion machine, a quick warm-up of the appertaining portion of coolant can be achieved and consequently, the heating heat exchanger begins to function relatively soon, and so does the heating system of the motor vehicle for whose drive the combustion machine has preferably been provided.

Consequently, the term "heating heat exchanger" is to be understood as referring to a heat exchanger in which heat is transferred from the coolant of the cooling system to the ambient air that is provided for heating the interior of a motor vehicle. Therefore, the heating heat exchanger, like the main cooler, constitutes an ambient heat exchanger.

As the operating temperature of the combustion machine rises, the cooling system can be prevented from overheating by activating the bypass when the regulator is in the second position so that a larger volume flow of coolant continues to be pumped through the internal combustion engine in the small cooling circuit, thus bypassing the main cooler. The bypass that bypasses the heating heat exchanger can be advantageous in this context since the maximum volume flow through the heating heat exchanger—which is limited by the cross sections of the flow passages of the heating heat exchanger and of the lines of the cooling system that lead to and away from the heating heat exchanger—is preferably dimensioned so as to be relatively small, as a result of which it is not the entire volume flow of coolant that can and should be conveyed through the heating heat exchanger when the regulator is in the second position. This is particularly so because it can be provided that coolant flows through the heating heat exchanger when the regulator is in the first position as well as in all subsequent positions.

When the regulator is in the third position, the main cooler is then activated, which, due to a transfer of heat from the coolant to the ambient air, has especially the exclusive purpose of cooling the coolant. In this manner, it can be provided that, when the regulator is in the third position, the coolant is conveyed in a large cooling circuit of the cooling system.

In a preferred embodiment of the combustion machine according to the invention, in order to ensure that, in the third position, the entire amount of coolant is conveyed through the heating heat exchanger and the main cooler, it can be provided that, when the regulator is in the third position, it once again prevents coolant from flowing through the bypass.

In another preferred embodiment of the combustion machine according to the invention, the regulator can be provided with a zero position that is before the first position. In this context, it is provided that, when the regulator is in this zero position, it completely prevents coolant from flowing through the cooling system. This can be achieved especially preferably in that, when the regulator is in the zero position, it closes the cooling system in a segment located between the coolant pump and the internal combustion engine, and especially on the pressure side of the coolant pump.

An advantageous cooling of the internal combustion engine of the combustion machine according to the invention can be achieved when a cylinder housing (especially a cylinder block) as well as a cylinder head of the internal combustion engine each have at least one cooling duct, whereby the coolant flows through the cooling ducts in a manner that is controlled by the regulator on an as-needed basis. In this context, it can especially be provided that, when the regulator is in the first position, it allows coolant to flow through the coolant duct of the cylinder head and it prevents coolant from flowing through the coolant duct of the cylinder housing. In this manner, it can be achieved that, during operation of the combustion machine following a cold start, the coolant flows only through the cylinder head (and through the heating heat exchanger) of the combustion machine, whereby said cylinder head is thermally stressed to a greater extent than the cylinder housing and it has a lower mass that, in this operating state of the combustion machine, might still absorb thermal energy from the coolant, as a result of which it is possible to achieve not only a quick warming up of the coolant, which is advantageous for the heating capacity of the heating heat exchanger, but at the same time, to also already achieve the cooling of the cylinder head. In contrast, no provision is made yet for coolant to flow through the coolant duct of the cylinder housing, as a result of which it can be achieved that, in this operating state, the cylinder walls of the cylinder housing can warm up faster, which has a positive impact on friction losses between the cylinder and the piston as well as on the emission behavior of the combustion machine.

Connecting the coolant duct of the cylinder housing to the cooling system is preferably only done once the regulator is in an intermediate position between the second position and the third position, whereby then the operating temperature of the combustion machine can already be so high that it is appropriate or necessary to also cool the cylinder housing.

In another preferred embodiment of the combustion machine according to the invention, it can be additionally provided that it is possible to shift between at least two of the positions of the regulator, either in steps or else continuously, so that the regulator can be set and also held in one or more partial steps. This permits an improved adaptation of the flow of coolant through the individual components as a function of the actual demand. Such an embodiment of the combustion machine can be particularly useful if the coolant pump cannot be regulated independently of its pumping speed in terms of the volume flow. This can especially be the case with a coolant pump that is driven directly by the internal combustion engine.

It can also be provided that the regulator can be switched between at least two positions of the regulator, and especially between the second position and the third position, as a function of an engine characteristic map. Especially the load over the rotational speed at which the combustion machine is operated can be plotted in such an engine characteristic map. This advantageously allows the transfer of heat from the coolant to the ambient air in the main cooler to be controlled as a function of the operating state and consequently as a function of the heat generation of the combustion machine. This makes it possible, for instance, to keep the temperature of the coolant largely constant or, whenever necessary, to regulate it to a defined value (range) that can especially be dependent on the operating state of the combustion machine. Particularly in the case of a relatively low load and/or rotational speed, a higher coolant temperature can be set which can lead to a correspondingly high oil temperature and thus to relatively low friction losses. Conversely, in the case of a higher load and/or rotational speed, the coolant temperature can be reduced in order to protect the internal combustion engine from overheating. This makes it possible to also perform an anticipatory regulation of the temperature of the coolant, a procedure which, unlike, for example, regulation by means of a temperature sensor, is not configured to respond to a temperature change that has already taken place. In this context, it can be especially preferably provided that the setting between the at least two positions is carried out in steps or continuously as a function of the engine characteristic map of the combustion machine.

In an embodiment of the combustion machine according to the invention that can be implemented technically very well, it can be provided that the regulator comprises a lock valve that can be moved by the actuator in a translatory and/or rotatory manner, so that its movement brought about by means of the actuator leads to a closing or opening of inlets and/or outlets corresponding to the positions of the regulator, said inlets and/or outlets connecting the regulator to appertaining components of the cooling system so as to convey fluid.

It can also conceivably be advantageous for the regulator to be provided with more than one lock valve, whereby then, it is preferably provided that only the first of the lock valves is moved by the actuator, while a movement of the other lock valve or of the other lock valves (in at least one segment of the movement of the first lock valve) is effectuated by the first lock valve.

It has proven to be structurally advantageous if the regulator has a first lock valve that is moved by the actuator and a second lock valve that is moved by the first lock valve, whereby the second lock valve is provided (preferably exclusively) for purposes of reaching the zero position of the regulator in that the second lock valve, in a closed position, prevents coolant from flowing through the cooling system. In this context, it can be especially preferably provided that, in its range of movement, the first lock valve only moves the second lock valve along in certain sections. This especially allows a simplified configuration of the second lock valve which, in the preferred embodiment of the combustion machine according to the invention, is only moved between the zero position and the first position (and optionally conversely) when the regulator is adjusted, whereas a movement of the second lock valve between the other positions by means of the first lock valve is no longer provided for when the regulator is adjusted. Such a coupling of the first and second lock valves can be attained, for instance, by means of a coupler lever mechanism, a Geneva gearing and/or a cam mechanism.

Securing the position of the second lock valve, which might not be permanently coupled to the first lock valve, can especially be based on a non-positive connection in that forces are required to overcome the non-positive connection in order to move the second lock valve, and these forces are greater than those that result from the mass of the second lock valve, that is to say, caused by inertia or gravity, and/or due to hydraulic pressure of the coolant on the second lock valve in the directions of movement made possible by the position of the second lock valve. Alternatively or additionally, it is also possible to secure the position by means of a positive connection. Here, in particular, the position of the second lock valve can be secured by the first lock valve.

An embodiment of the combustion machine according to the invention that is structurally simple and advantageous especially in terms of the required installation space is characterized in that the lock valve(s) is/are configured as rotary valves.

The actuator of the regulator is also preferably actuated as a function of a local temperature associated with the internal combustion engine, said temperature being especially preferably measured in a coolant duct (particularly preferably at a place that is closer to an outlet than to an inlet of this coolant duct) and/or in a section of the cooling system that is connected to an outlet of this coolant duct. For this purpose, the combustion machine according to the invention can have a coolant temperature sensor arranged in the coolant duct of the internal combustion engine or in a coolant line connected directly to this coolant duct in the flow direction of the coolant.

If only one temperature sensor is to be provided here, it is then preferably located in a coolant duct of the cylinder head. An improved regulation of the distribution of the coolant by means of the regulator, however, can be achieved in that the regulator is actuated as a function of a first local temperature of the coolant in the cylinder head as well as of a second local temperature of the coolant in the cylinder housing. Accordingly, a first coolant temperature sensor situated in a coolant duct of the cylinder head as well as a second coolant temperature sensor situated in a coolant duct of the cylinder housing can be provided.

The indefinite articles ("a", "an"), especially in the patent claims and in the description that generally explains the patent claims, are to be understood as such and not as numbers. Therefore, components described in a concrete manner should be understood in such a way that they are present at least once and can also be present several times.

BRIEF DESCRIPTION OF THE DRAWINGS

The combustion machine according to the invention will be explained in greater detail below making reference to the embodiments shown in the drawings. The drawings show the following.

DETAILED DESCRIPTION OF THE INVENTION

Figure 1:
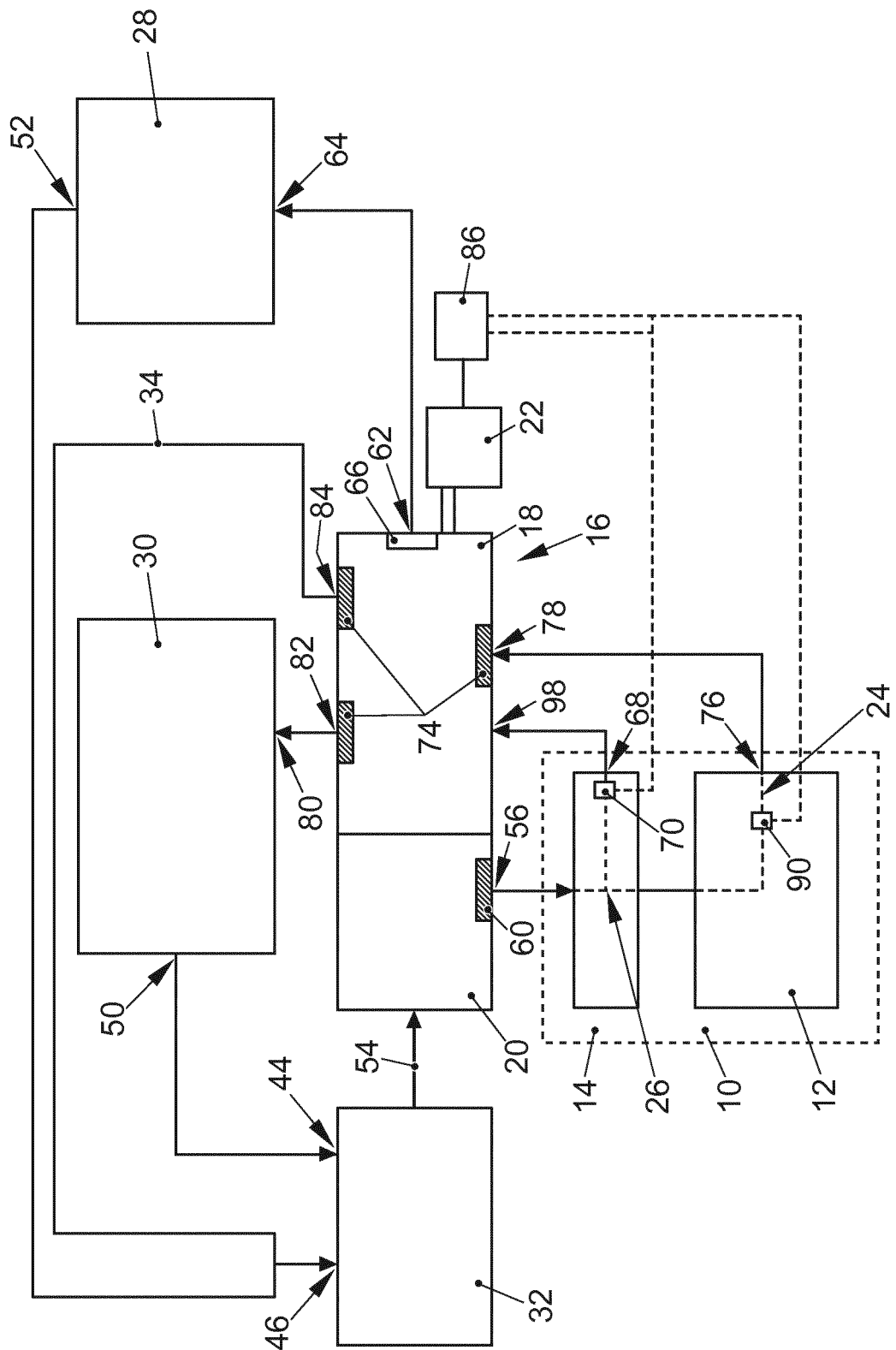
FIG. 1: a combustion machine according to the invention, schematically in a block diagram.

FIG. 1 schematically shows a combustion machine according to the invention. It comprises an internal combustion engine 10 that can be configured, for instance, as a reciprocating-piston internal combustion engine that works in accordance with the Otto or Diesel principle, and it comprises a cylinder housing 12 as well as a cylinder head 14. Moreover, the combustion machine also has a regulator 16 with a first lock valve 18, a second lock valve 20 and an actuator 22. The first lock valve 18 can be moved by means of the actuator 22, whereas, in a segment of the total possible movement of the first lock valve 18, the second lock valve 20 is moved along by the first lock valve 18.

The regulator 16 is integrated into a cooling system of the combustion machine. Moreover, coolant ducts 24, 26 of the cylinder housing 12 and of the cylinder head 14, a heating heat exchanger 28, a main cooler 30 as well as a coolant pump 32 are also integrated into this cooling system. In this context, the individual components of the cooling system are connected via coolant lines so as to convey fluid. Moreover, the cooling system also encompasses a bypass 34 that connects an outlet 84 of the regulator 16 to an inlet 46 of the coolant pump 32 while bypassing the heating heat exchanger 28 as well as the main cooler 30.

FIGS. 2 to 5 show a conceivable structural configuration of the regulator 16 according to FIG. 1. In this regulator 16, the lock valves 18, 20 are configured in the form of rotary valves that, depending on their particular direction of rotation, open or close inlets or outlets for the coolant that is flowing through the regulator 16.

Figure 2:
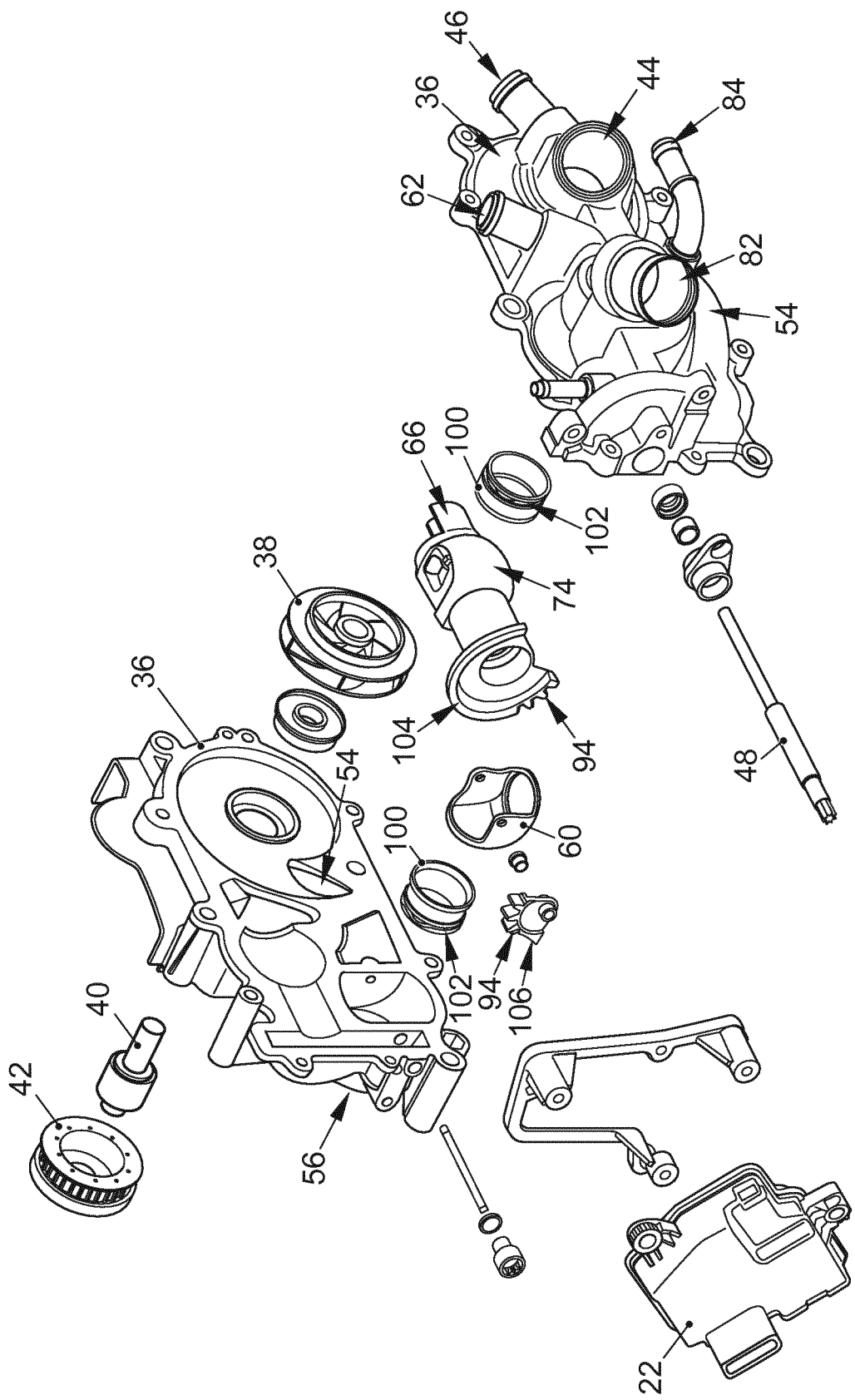
FIG. 2: a regulator for a combustion machine according to the invention, in an exploded view.
Figure 3:
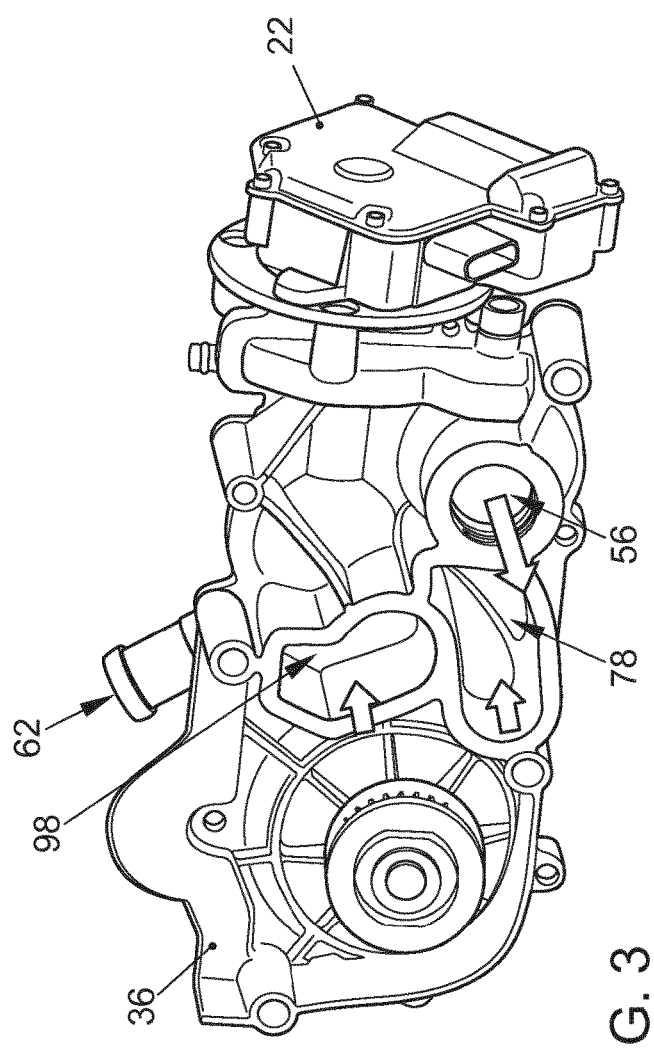
FIG. 3: the regulator according to FIG. 2, in a side view.
Figure 5:
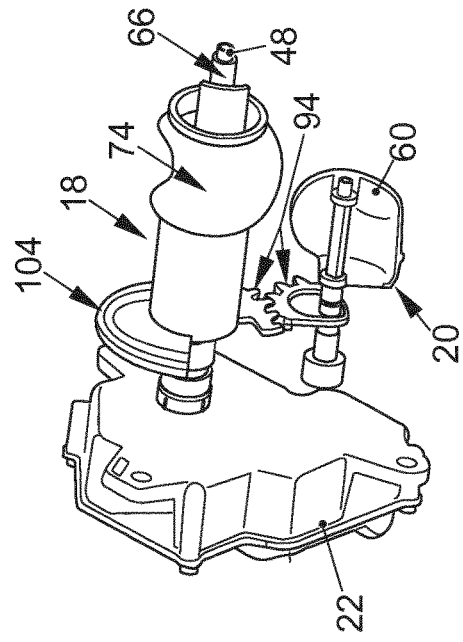
FIG. 5: an actuator and the lock valve of the regulator as shown in FIGS. 2 to 4, which are actuated directly or indirectly by an actuator, in an isolated view.
Figure 4:
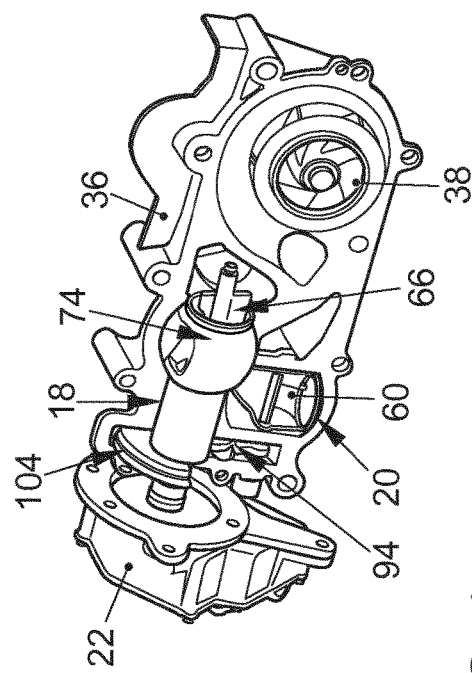
FIG. 4: the regulator according to FIGS. 2 and 3, with the housing only partially depicted.

The regulator 16 comprises a housing 36 into which an impeller 38 of a coolant pump 32 configured as an impeller pump is integrated so as to rotate. The rotation of the impeller 38 and thus the pumping of coolant in the cooling system are effectuated by the internal combustion engine 10, for which purpose a crankshaft (not shown here) of the internal combustion engine 10 is joined via a belt drive to a shaft 40 for the impeller 38. The only part of the belt drive that is shown in FIG. 2 is a belt wheel 42 of the coolant pump 32 that is joined to the shaft 40.

In order for the coolant to be pumped, coolant is fed to the impeller 38 via a first inlet 44 and a second inlet 46 of the coolant pump 32. The first inlet 44 is connected to an outlet 50 of the main cooler 30 via a coolant line. The second inlet 46 is connected via coolant lines to the bypass 34 as well as to an outlet 52 of the heating heat exchanger 28. In this context, it is provided for the coolant line that forms the bypass 34 to be integrated as a duct into the housing 36.

Owing to the rotation of the impeller 38, the coolant is pumped to a first outlet 56 of the regulator 16 through a coolant duct 54 formed inside the housing 36. When the regulator 16 is in a zero position, this first outlet 56 is closed by means of a closure element 60 of the second lock valve 20 that is in a closed position. This completely prevents the coolant from circulating through the cooling system. When the regulator 16 is in the zero position 58, the first lock valve 18 is in an orientation in which a second outlet 62 of the regulator 16, which is connected via a coolant line to an inlet 64 of the heating heat exchanger 28, is closed by means of a first closure element 66 of the first lock valve 18. The zero position 58 of the regulator 16 is provided for a short period of time after a cold start of the combustion machine. A cold start of the combustion machine is characterized in that the components of the combustion machine exhibit temperatures that essentially match the ambient temperature, but that are at least below a defined limit temperature.

After a cold start of the combustion machine and after a defined first limit value for a local coolant temperature has been reached, which is measured by means of a first coolant temperature sensor 70 integrated into the coolant duct 26 in the vicinity of an outlet 68 of the cylinder head 14, the regulator 16 is switched from the zero position 58 to a first position 72 by means of the actuator 22. For this purpose, the actuator 22 is actuated by a motor control unit 86 of the combustion machine to which the signal of the coolant temperature sensor 70 is transmitted. In this context, it can be provided that the regulator 16 is switched from the zero position 58 to the first position 72, either stepwise or continuously, as a function of the local coolant temperature, as measured by means of the first coolant temperature sensor 70, and this is done in that the first lock valve 18 and the second lock valve 20, which is thus coupled and still rotating, are rotated as a function of a temperature rise. In this process, the lock valves 18, 20 can also be rotated back temporarily. The first lock valve 18 is rotated by means of the actuator 22, which is joined to the first lock valve 18 via a shaft 48.

When the regulator 16 is in the first position, the second lock valve 20 is in an open position in which the first outlet 50 is no longer closed off by the closure element 60, but rather, it is essentially completely open. At the same time, the first lock valve 18 is in an orientation in which its first closure element 66 no longer closes the second outlet 62 but rather opens it essentially completely. At the same time, a second closure element 74 of the first lock valve 18 closes a first inlet 78 of the regulator 16 that is connected to an outlet 76 of the cylinder housing 12, also a third outlet 82 of the regulator 16 that is connected to an inlet 80 of the main cooler 30 via a coolant line as well as a fourth outlet 84 of the regulator 16 that is connected to the bypass 34. Therefore, when the regulator 16 is in the first position, the circulation of the coolant effectuated by the coolant pump 32 only takes place in a small cooling circuit comprising the coolant pump 32, the regulator 16, the cylinder head 14 and the heating heat exchanger 28.

After a defined second limit value has been reached for the local coolant temperature in the cylinder head 14, as measured by means of the first coolant temperature sensor 70, the regulator 16 is switched from the first position to a second position 88. In this process, the first lock valve 18 is rotated into an orientation in which the fourth outlet 84 is increasingly opened by the second closure element 74, as a result of which the bypass 34 is integrated into the small cooling circuit parallel to the heating heat exchanger 28. Here, the first inlet 78 and the third outlet 82 of the regulator 16 continue to be kept closed by the first lock valve 18. During this movement of the first lock valve 18, the second lock valve 20 remains in its open position since it is no longer coupled to the first lock valve 18 so as to rotate. Due to the integration of the bypass 34 into the cooling circuit, the entire volume flow of coolant that is being pumped can be increased in order to achieve a correspondingly high cooling capacity for the cylinder head 14.

The merely phased rotational coupling of the first lock valve 18 to the second lock valve 20 is effectuated by segment teeth 94 that are only intermeshed when the first lock valve 18 is rotated back and forth between the zero position 58 and the first position 72. The position of the second lock valve 20 is secured in its open position with a positive fit by the first lock valve 18 in that a ring section 104 that adjoins the segment teeth 94 of the second lock valve 20 engages with a concave depression 106 that adjoins the segment teeth 94 and is moved so as to slide in this depression 106 as the first lock valve 18 rotates.

After a defined third limit value has been reached for the local coolant temperature in the cylinder head 14, as measured by means of the first coolant temperature sensor 70, and/or after a first defined first limit value has been reached for a local coolant temperature in the cylinder housing 12 measured by means of a second coolant temperature sensor 90 situated in the vicinity of the outlet 76 of the cylinder housing 12, the regulator 16 is switched from the second position 88 to an intermediate position 92. In this process, the first lock valve 18 is rotated into an orientation in which the second closure element 74 also increasingly opens the first inlet 78 of the regulator 16. Consequently, only the third outlet 82 of the regulator 16 is still kept closed, thus preventing coolant from flowing through the main cooler 30. Therefore, in the intermediate position 92, it is provided that the coolant also flows through the cylinder housing 12.

Figure 6:
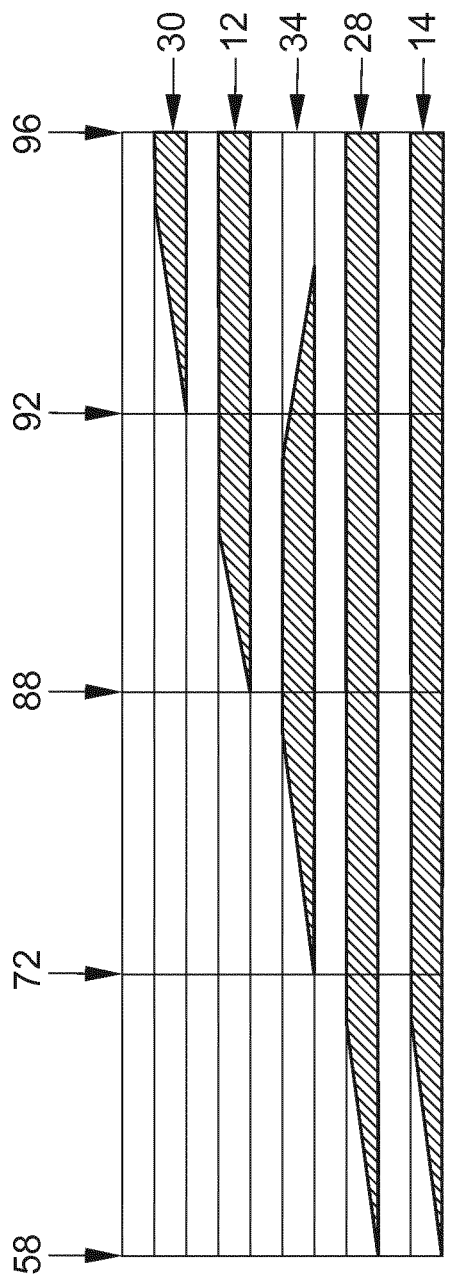
FIG. 6: the flow of coolant through the individual components of a combustion machine according to the invention as shown in FIG. 1, as a function of the various positions of the appertaining regulator.

After a defined fourth limit value has been reached for the local coolant temperature in the cylinder head 14, as measured by means of the first coolant temperature sensor 70, and/or after a second defined limit value has been reached for the local coolant temperature in the cylinder housing 12, as measured by means of the second coolant temperature sensor 90, and/or as a function of the an engine characteristic map of the combustion machine stored in the motor control unit 86, the regulator 16 is switched from the intermediate position 88 to a third position 96. In this process, the third inlet 82 of the regulator 16 is increasingly opened and consequently, the main cooler 30 is incorporated into what is then a large cooling circuit, while at the same time, the fourth outlet 84 of the regulator 16 is increasingly closed once again by the second closure element 74 of the first lock valve 18 (see FIG. 6). This ensures that, except for a relatively small part of the coolant flow, which is conveyed through the heating heat exchanger 28, the coolant is fed completely via the main cooler 30, where it is cooled by means of heat transfer to the ambient air.

The third position of the regulator 16 is also provided for when the combustion machine is not in operation. This is meant, on the one hand, to implement a failsafe function by means of which—in case of a defect of the cooling system that might been caused, for example, by weasel bites when a motor vehicle powered by a combustion machine is not in operation—it is possible to continue to ensure a (functionally limited) operation of the coolant system. Moreover, when the combustion machine is not in operation, the third position of the regulator 16 allows the cooling system to be filled and emptied within the scope of maintenance work.

The housing 36 of the regulator 16 is provided to allow a direct screwed connection to the cylinder head 14 of the internal combustion engine 10 on the side that forms the first outlet 56 inlet, the first inlet 78 as well as a second inlet 98 that is connected to the outlet 68 of the cylinder head 14.

The first lock valve 18 and the second lock valve 20 are sealed in the housing 36 by a spring-loaded (by means of a disk spring 102), ring-shaped sealing element 100.

LIST OF REFERENCE NUMERALS 10 internal combustion engine
12 cylinder block
14 cylinder head
16 regulator
18 first lock valve
20 second lock valve
22 actuator
24 coolant duct of the cylinder housing
26 coolant duct of the cylinder head
28 heating heat exchanger
30 main cooler
32 coolant pump
34 bypass
36 housing
38 impeller
40 shaft
42 belt wheel
44 first inlet of the coolant pump
46 second inlet of the coolant pump
48 shaft
50 outlet of the main cooler
52 outlet of the heating heat exchanger
54 coolant duct
56 first outlet of the regulator
58 zero position of the regulator
60 closure element of the second lock valve
62 second outlet of the regulator
64 inlet of the heating heat exchanger
66 first closure element of the first lock valve
68 outlet of the cylinder head
70 first coolant temperature sensor
72 first position of the regulator
74 second closure element of the first lock valve
76 outlet of the cylinder housing
78 first inlet of the regulator
80 inlet of the main cooler
82 third outlet of the regulator
84 fourth outlet of the regulator
86 motor control unit
88 second position of the regulator
90 second coolant temperature sensor
92 intermediate position of the regulator
94 segment teeth
96 third position of the regulator
98 second inlet of the regulator
100 sealing element
102 disk spring 104 ring section
106 depression

The invention claimed is:

1. A combustion machine comprising:
an internal combustion engine; and
a cooling system, wherein the cooling system includes:
  a coolant pump,
  a main cooler,
  a heating heat exchanger,
  a bypass that bypasses the heating heat exchanger, and
  a flow regulator, the flow regulator comprising:
    an actuator configured to regulate a distribution of coolant as a function of at least one local coolant temperature, and
    a first lock valve that is moved by the actuator and a second lock valve that is coupled to and moved by the first lock valve, wherein a position of the second lock valve can be in an open position in which a first outlet of the flow regulator is not closed by the first lock valve, or a closed position in which the first outlet of the flow regulator is closed by the first lock valve, wherein the first outlet of the flow regulator directs coolant to a cylinder head of the internal combustion engine;
wherein, when the actuator is actuated in one direction, the flow regulator,
  in a first position after a cold start of the internal combustion engine and after a defined first limit value for the at least one local coolant temperature, allows coolant to flow through the cylinder head of the internal combustion engine and through the heating heat exchanger, and prevents coolant from flowing through a cylinder housing of the internal combustion engine, through the bypass, and through the main cooler by:
    orienting the first lock valve to:
      open a second outlet of the flow regulator, which directs coolant to an inlet of the heating heat exchanger,
      close a first inlet of the flow regulator, which receives coolant from an outlet of the cylinder housing of the internal combustion engine,
      close a third outlet of the flow regulator, which directs coolant to an inlet of the main cooler, and
      close a fourth outlet of the flow regulator, which directs coolant to the bypass; and
    orienting the second lock valve into the open position; and
  in a second position after a defined second limit value for the at least one local coolant temperature, allows coolant to flow through the cylinder head of the internal combustion engine, through the heating heat exchanger, and through the bypass, and prevents coolant from flowing through the cylinder housing of the internal combustion engine and through the main cooler by orienting the first lock valve to open the fourth outlet of the flow regulator; and
  in a third position after a defined third limit value for the at least one local coolant temperature, allows coolant to flow through the cylinder head of the internal combustion engine, through the cylinder housing of the internal combustion engine, through the heating heat exchanger, and through the main cooler, and prevents coolant from flowing through the bypass by orienting the first lock valve to open the third outlet of the flow regulator, opening the first inlet of the flow regulator, and closing the fourth outlet of the flow regulator.

2. The combustion machine according to claim 1, wherein, when the flow regulator is in a zero position that is before the first position, the flow regulator prevents coolant from flowing through the cooling system by:
  orienting the first lock valve to close the second outlet; and
  orienting the second lock valve into the closed position.

3. The combustion machine according to claim 2, wherein, when the flow regulator is in the zero position, the flow regulator prevents coolant from flowing in a segment of the cooling system located between the coolant pump and the internal combustion engine.

4. The combustion machine according to claim 1, wherein, when the flow regulator is in the first position, the flow regulator prevents coolant from flowing through a coolant duct of the cylinder housing.

5. The combustion machine according to claim 4, wherein, when the flow regulator is in an intermediate position that is between the second position and the third position, the flow regulator allows coolant to flow through the coolant duct of the cylinder housing by:
  orienting the first lock valve to open the first inlet of the flow regulator.

6. The combustion engine according to claim 1, wherein, when the flow regulator is in an intermediate position that is between the second position and the third position, the flow regulator allows coolant to flow through the cylinder housing by:
  orienting the first lock valve to open the first inlet of the flow regulator.

7. The combustion machine according to claim 1, wherein, the first lock valve only moves the second lock valve by a segment of the first lock valve.

8. The combustion machine according to claim 1, wherein the open and closed positions of the second lock valve are secured by means of a non-positive and/or positive connection if the second lock valve is not being moved by the first lock valve.

9. The combustion machine according to claim 1, wherein the first lock valve and the second lock valve are configured as rotary valves.

10. The combustion machine according to claim 4, further comprising a first coolant temperature sensor that is arranged in a coolant duct of the cylinder head and a second coolant temperature sensor that is arranged in the coolant duct of the cylinder housing.

11. The combustion machine according to claim 1, wherein the flow regulator can be switched between the first position, the second position, and the third position as a function of an engine characteristic map.

12. The combustion machine according to claim 4, wherein a first outlet of a coolant duct of the cylinder head is directed to an inlet of the coolant duct of the cylinder housing, and a second outlet of the coolant duct of the cylinder head is directed to a second inlet of the flow regulator.

13. The combustion machine according to claim 1, wherein an outlet of the coolant pump is upstream of the flow regulator, such that the outlet of the coolant pump directs coolant flow to the first outlet of the flow regulator.

* * * * *